United States Patent
Hupfield

(10) Patent No.: US 7,642,326 B2
(45) Date of Patent: Jan. 5, 2010

(54) SUBSTITUTED AMINOSILOXANES AND POLYMERIC PRODUCTS

(75) Inventor: Peter Hupfield, Carmarthen (GB)

(73) Assignee: Dow Corning Corporation, Midland, MI (US)

( * ) Notice: Subject to any disclaimer, the term of this patent is extended or adjusted under 35 U.S.C. 154(b) by 189 days.

(21) Appl. No.: 10/591,842

(22) PCT Filed: Feb. 14, 2005

(86) PCT No.: PCT/US2005/004477

§ 371 (c)(1),
(2), (4) Date: Sep. 5, 2006

(87) PCT Pub. No.: WO2005/103156

PCT Pub. Date: Nov. 3, 2005

(65) Prior Publication Data

US 2007/0208152 A1    Sep. 6, 2007

(30) Foreign Application Priority Data

Apr. 1, 2004   (GB) ................... 0407433.2

(51) Int. Cl.
*C08F 18/20*   (2006.01)

(52) U.S. Cl. .............. 526/245; 526/279; 526/292.1; 526/310; 526/319; 526/328

(58) Field of Classification Search ............. 526/279, 526/245
See application file for complete search history.

(56) References Cited

U.S. PATENT DOCUMENTS

| | | | |
|---|---|---|---|
| 5,068,295 A | 11/1991 | Misaizu et al. | |
| 5,247,008 A | 9/1993 | Michels et al. | |
| 5,536,304 A | 7/1996 | Coppens et al. | |
| 5,739,192 A * | 4/1998 | Blizzard et al. | 524/379 |
| 5,883,185 A | 3/1999 | Matsumura et al. | |
| 6,472,019 B1 | 10/2002 | Yamaguchi et al. | |
| 6,582,620 B2 | 6/2003 | Miyadai et al. | |
| 6,641,805 B1 * | 11/2003 | Morita et al. | 424/78.03 |

FOREIGN PATENT DOCUMENTS

| | | |
|---|---|---|
| JP | 08109580 A * | 4/1996 |
| WO | WO 03/016380 | 2/2003 |
| WO | WO 2004/069935 | 8/2004 |
| WO | WO 2004/069955 | 8/2004 |

OTHER PUBLICATIONS

Machine translation of Ohashi et al., JP 08-109580, translated Feb. 20, 2009.*

* cited by examiner

*Primary Examiner*—Marc S Zimmer
*Assistant Examiner*—Nicole M Buie
(74) *Attorney, Agent, or Firm*—Alan Zombeck

(57) ABSTRACT

Polymeric reaction products derived from a substituted aminosiloxane and a fluorosubstituted alkyl ester of an ethylenically carboxylic acid are disclosed. The polymeric reaction products are suitable for application to substrates such as textiles, particularly fabrics, to impart oil repellent properties to textiles.

11 Claims, No Drawings

SUBSTITUTED AMINOSILOXANES AND POLYMERIC PRODUCTS

CROSS REFERENCE TO RELATED APPLICATIONS

This application is a U.S. national stage filing under 35 U.S.C. §371 of PCT Application No. PCT/US05/04477 filed on 14 Feb. 2005, currently pending, which claims the benefit of GB Patent Application No. 0407433.2 filed 1 Apr. 2004 under 35 U.S.C. §119(a)-(d) and 35 U.S.C. §365(a). PCT Application No. PCT/US05/04477 and GB Patent Application No. 0407433.2 are hereby incorporated by reference.

FIELD OF INVENTION

This invention relates to polymeric reaction products derived from the substituted aminosiloxanes and fluoro-substituted alkyl esters of an ethylenically carboxylic acid. The polymeric reaction products are suitable for application to substrates such as textiles, particularly fabrics, to impart oil repellent properties (oleophobicity) to the textile.

BACKGROUND

Fluorocarbon polymers are extensively used in the textile industry to impart oleophobicity/oil repellency to a fabric. For example, U.S. Pat. No. 5,247,008 describes finishing agents for textiles, leather, paper and mineral substrates which are aqueous dispersions of a copolymer of a perfluoroalkyl acrylate or methacrylate, an alkyl acrylate or methacrylate and an aminoalkyl acrylate or methacrylate.

U.S. Pat. No. 5,068,295 describes a water and oil repellent comprising a copolymer of a perfluoroalkyl acrylate or methacrylate, a polyorganosiloxane containing a vinyl group and a vinyl monomer containing an isocyanate or blocked isocyanate group.

U.S. Pat. Nos. 6,582,620 and 5,883,185 describe a treating composition for textiles to render them water and oil repellent obtained by cohydrolysis and condensation of (A) a fluorinated alkyl-bearing alkoxysilane, (B) an amino-bearing alkoxysilane, and (C) an alkoxysilyl-bearing polyorganosiloxane.

U.S. Pat No. 5,536,304 describes application of a blend of a succinic anhydride-terminated polydimethylsiloxane and a poly(fluoroalkyl methacrylate) to cotton to give a fabric with oil repellency.

U.S. Pat. No. 6,472,019 describes treating a textile with a water- and oil-repellent agent comprising a fluorine-containing polymer and a sulphated fatty acid compound and WO 2004/069935 and WO 2004/069955 describe a fluorine containing polymer delivered as an aqueous dispersion for textile treatment.

One of the major disadvantages of topical finishes prepared with fluorocarbon polymers is that they impart a harsh feel to the fabric surface. There is a need for textile treatment agents which impart oleophobicity and oil repellency to fabrics without imparting a harsh feel to the fabric surface, and preferably whilst at the same time imparting an improvement in feel compared to untreated fabric.

SUMMARY OF THE INVENTION

The present invention provides a composition comprising the reaction product of
  i. an aminosiloxane containing amino groups substituted by an olefinically unsaturated group,
  ii. a fluoro-substituted alkyl ester of an olefinically unsaturated carboxylic acid and optionally
  iii. one or more ethylenically unsaturated co-monomers.

The invention also includes a textile treatment composition comprising such a polymeric reaction product, and a process for rendering fabric, leather or paper oleophobic in which the polymeric reaction product is applied to the fabric, leather or paper.

DETAILED DESCRIPTION

In the aminosiloxane containing aminoalkyl groups, the aminoalkyl groups can be terminal groups on a polyorganosiloxane and/or pendant on the polyorganosiloxane. The amino groups are preferably secondary or primary amino groups and the aminoalkylgroups are preferably of the formula

wherein A and A' are each independently a linear or branched alkylene group having 1 to 6 carbon atoms; q=0-4; and R is hydrogen, an alkyl or hydroxyalkyl group having 1 to 4 carbon atoms, or an alkoxyalkyl or carboxyalkyl group having 1 to 4 carbon atoms in the alkyl moiety. If R is a carboxyalkyl group, it is preferably esterified. Most preferably q=0 or 1; and A and A' (if present) each contain 2 to 4 carbon atoms.

The groups attached to silicon other than aminoalkyl groups are generally optionally substituted alkyl, aryl or aralkyl groups and are preferably alkyl groups having 1 to 4 carbon atoms, most preferably methyl groups. The aminosiloxane is preferably a linear polyorganosiloxane, but can be branched, for example it can contain branching units such as $CH_3SiO_{3/2}$ units, but such branching units preferably form no more than 5 mole % of the polyorganosiloxane.

The polyorganosiloxane containing aminoalkyl groups attached to silicon used in the invention can for example be of the formula

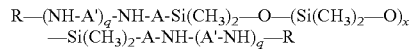

where A, A', R and q are defined as above and x is for example 4-1000, or may have the formula

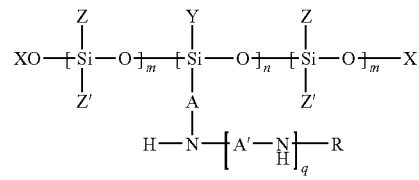

where A, A', R and q are defined as above; Y is an optionally substituted alkyl or aryl group; Z and Z', which can be the same or different, are each an optionally substituted alkyl, aryl or aralkyl group; X is hydrogen or an aliphatic group, preferably an alkyl group having 1 to 30, particularly 6 to 20, carbon atoms, or a triorganosilyl group such as trimethylsilyl; m is for example 4-1000; and n is for example 1-1000, preferably 2-100. The preparation of such amino-functional polysiloxanes is described in WO-A-03/16380.

The aminosiloxane in which at least some of the amino groups are substituted by an ethylenically unsaturated group can be prepared by reacting a polyorganosiloxane containing aminoalkyl groups attached to silicon with an ester compound containing two ethylenically unsaturated groups. Preferably the ester compound contains two acrylate or methacrylate ester groups. The amino groups of the polyorganosiloxane containing aminoalkyl groups react with one of the ethylenically unsaturated groups of the ester compound by Michael-type addition.

The amino groups of the polyorganosiloxane containing aminoalkyl groups that is reacted with the compound containing two ethylenically unsaturated groups are preferably primary amine groups. Primary amino groups react more readily with ethylenically unsaturated groups in Michael-type addition than secondary amine groups do, but the product is a secondary amine which can take part in further Michael-type addition. This can lead to crosslinked and potentially intractable materials. The secondary amine groups can be formed during preparation of the polyorganosiloxane containing aminoalkyl groups or can be formed from a polyorganosiloxane containing primary amino groups by a Michael-type addition reaction with a compound containing a single ethylenically unsaturated group, for example an acrylate or methacrylate ester group.

The polyorganosiloxane containing primary amino groups can for example contain aminoalkyl groups of the formula

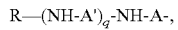
R—(NH-A')$_q$-NH-A-, and can be of the formula

R—(NH-A')$_q$-NH-A-Si(CH$_3$)$_2$—O—(Si(CH$_3$)$_2$—O)$_x$—Si(CH$_3$)$_2$-A-NH-(A'-NH)$_q$—R or

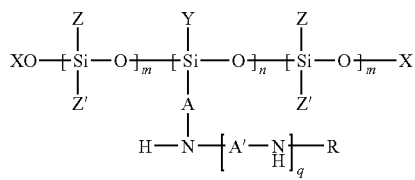

where A, A', q, Y, Z and Z', x, m and n are defined as above. Examples of preferred aminoalkyl groups containing primary amino groups include —(CH$_2$)$_3$NH$_2$, —(CH$_2$)$_4$NH$_2$, —(CH$_2$)$_3$NH(CH$_2$)$_2$NH$_2$, —CH$_2$CH(CH$_3$)CH$_2$NH(CH$_2$)$_2$NH$_2$, —(CH$_2$)$_3$NHCH$_2$CH$_2$NH(CH$_2$)$_2$NH$_2$, —CH$_2$CH(CH$_3$)CH$_2$NH(CH$_2$)$_2$3NH$_2$, —(CH$_2$)$_3$NH(CH$_2$)$_4$NH$_2$ and —(CH$_2$)$_3$O(CH$_2$)$_2$NH$_2$.

The aminosiloxane can be a modified aminosiloxane. For example, prior to reaction of the aminosiloxane with a molecule containing two ethylenically unsaturated groups it can be reacted with a compound reactive with amino groups such as a lactone, epoxide, isocyanate or anhydride. Lactones react with amino groups to form an amidic ester linkage. Epoxides react with amino groups —NHR to form a —N(R)—CH$_2$—CHOH— linkage. Isocyanates react with amino groups to form a urea linkage. Anhydride groups react with amino groups to form an amide linkage. The modifying reaction is preferably carried out with a molar ratio of ethylenically unsaturated groups to primary amino groups of less than 1:1, for example 0.1:1 to 0.9:1, particularly 0.4:1 to 0.8:1, so that many but not all of the primary amino groups are modified. The remaining amino groups are then reacted with diacrylate to yield the acrylate functional siloxane. This method of first reacting most of the available NH bonds helps to control the amount of acrylate functionality incorporated into the aminopolysiloxane.

The compound containing a single ethylenically unsaturated group which is reacted with the polyorganosiloxane containing primary or secondary amino groups is preferably an acrylate or methacrylate ester, although alternative compounds such as acrylonitrile, vinyl chloride or styrene can be used. The acrylate or methacrylate ester is preferably of the formula CH$_2$=CR"—COO—R', where R" is hydrogen or methyl and R' is an alkyl or substituted alkyl group having 1 to 20 carbon atoms. Acrylate esters are preferred as they more readily undergo Michael-type addition. Examples of alkyl esters are methyl, ethyl, butyl, hexyl, 2-ethylhexyl, octyl and lauryl esters. The compound containing a single ethylenically unsaturated group which is reacted with the polyorganosiloxane containing primary or secondary amino groups may also be an acrylate ester of the formula, CH$_2$=C(X)COO-D-R$_f$, where R$_f$ is a branched or linear fluoroalkyl group having 3 to 21 carbon atoms, X is a monovalent organic group, and D is a divalent organic group. D may for example be a linear or branched alkylene group having 1 to 20 carbon atoms, for example a group of the formula —(CH$_2$)$_x$— where x is 1 to 10, a group of the formula —SO$_2$N(R$^1$)R$^2$— or of the formula —CON(R$^1$)R$^2$—, where R$^1$ is an alkyl group having 1 to 10 carbon atoms and R$^2$ is a linear or branched alkylene group having 1 to 10 carbon atoms, or a group of the formula —CH$_2$CH(OR$^3$)CH$_2$— where R$^3$ represents a hydrogen atom or an acyl group having 1 to 10 carbon atoms such as formyl or acetyl, or a group of the formula —Ar—CH$_2$— where Ar is an arylene group optionally having a substituent. X may be for example H, Me, Cl, Br, I, F, CN, CF$_3$. Specific examples of suitable fluoroalkyl acrylate esters are CF$_3$(CF$_2$)$_7$(CH$_2$)$_2$OCOCH=CH$_2$
CF$_3$(CF$_2$)$_7$(CH$_2$)$_{10}$OCOCH=CH$_2$
CF$_3$(CF$_2$)$_6$CH$_2$OCOCH=CH$_2$
CF$_3$(CF$_2$)$_8$CH$_2$OCOCH=CH$_2$
(CF$_3$)$_2$CF(CF$_2$)$_6$(CH$_2$)$_2$OCOCH=CH$_2$
(CF$_3$)$_2$CF(CF$_2$)$_8$(CH$_2$)$_2$OCOCH=CH$_2$
(CF$_3$)$_2$CF(CF$_2$)$_{10}$(CH$_2$)$_2$OCOCH=CH$_2$
CF$_3$(CF$_2$)$_9$(CH$_2$)$_2$OCOCH=CH$_2$
CF$_3$(CF$_2$)$_{11}$(CH$_2$)$_2$OCOCH=CH$_2$
CF$_3$(CF$_2$)$_7$SO$_2$N(CH$_3$)(CH$_2$)$_2$OCOCH=CH$_2$
CF$_3$(CF$_2$)$_7$SO$_2$N(C$_2$H$_5$)(CH$_2$)$_2$OCOCH=CH$_2$
(CF$_3$)$_2$CF(CF$_2$)$_6$CH$_2$CH(OH)CH$_2$OCOCH=CH$_2$
C$_8$F$_{17}$—O—Ph—CH$_2$OCOCH=CH$_2$ (where Ph represents 1,4-phenylene)
(CF$_3$)$_2$CFOCOCH=CH$_2$
(CF$_3$)$_2$CF(CH$_2$)$_2$OCOCH=CH$_2$ The Michael-type addition reaction between the polyorganosiloxane containing primary amino groups and the compound containing a single ethylenically unsaturated group is preferably carried out with a molar ratio of ethylenically unsaturated groups to primary amino groups of 1:1 or less, for example 0.4:1 to 0.9:1, so that many but not all of the primary amino groups are converted to secondary amino groups. The reaction can be carried out at any temperature between 20 and 200° C. which is below the boiling point of the reagents, preferably at 50-120° C. The reaction can be carried out in bulk if the reagents are liquid but are preferably carried out in polar organic solvent solution. Suitable polar organic solvents include aromatic hydrocarbons such as xylene or toluene, alcohols such as butan-1-ol, ether alcohols such as butoxyethanol, esters such as butyl acetate and/or ketones such as methyl isobutyl ketone.

The polyorganosiloxane containing aminoalkyl groups, preferably primary amine groups, is reacted with the compound containing two ethylenically unsaturated groups in a Michael-type addition reaction which is preferably carried out in polar organic solvent solution using the solvents and reaction temperatures described above. If the polyorganosiloxane containing secondary amine groups is prepared by reaction between a polyorganosiloxane containing primary amino groups and a compound containing a single ethylenically unsaturated group, the subsequent reaction with the compound containing two ethylenically unsaturated groups can be carried out in the same vessel without separation of the intermediate product.

The ethylenically unsaturated groups of the compound containing two such groups are preferably acrylate ester groups but can alternatively be methacrylate ester groups. The compound can for example have the formula $CH_2=CR''-COO-X-OOC-CR''=CH_2$, where each R'' independently represents H or methyl and X represents a divalent organic linkage. Preferably X represents an alkylene group having 1 to 20 carbon atoms. The compound containing two ethylenically unsaturated groups can for example be hexane-1,6-diol diacrylate, butane-1,4-diol diacrylate, propylene glycol diacrylate or ethylene glycol diacrylate. It undergoes a Michael-type addition reaction with the polyorganosiloxane containing aminoalkyl groups to form substituted amine groups containing ethylenically unsaturated groups of the formula $-NH(R)-CH_2CHR''-COO-X-OOC-CR''=CH2.$ The compound containing two ethylenically unsaturated groups is preferably used in molar excess compared to amine groups of the aminosiloxane to avoid crosslinking of the aminosiloxane. The compound containing two ethylenically unsaturated groups can for example be used in 5 to 50% molar excess if it is desired to use the reaction product without purification, or can be used at 20 to 100% or even greater molar excess with removal of unreacted bis-ethylenically unsaturated compound.

The aminosiloxane substituted by an ethylenically unsaturated group can be used to produce a polymeric reaction product by carbon-to-carbon addition polymerisation, optionally with one or more ethylenically unsaturated comonomer. In particular the aminosiloxane can be copolymerised with a fluorocarbon monomer to form a treatment agent for fibrous products such as textiles, leather or paper which impart oleophobicity and oil repellency to the fibrous products without imparting a harsh feel. The aminosiloxane (I) can for example be copolymerised with (II) a fluoro-substituted alkyl ester of an olefinically unsaturated carboxylic acid and optionally (III) one or more ethylenically unsaturated co-monomers.

The fluoro-substituted alkyl ester monomer (ii) is preferably a fluoro-substituted alkyl ester of an ethylenically unsaturated carboxylic acid of the formula $CH_2=C(Y)COO-D-R_f$ where $R_f$ is a fluoroalkyl group having 1 to 21 carbon atoms, Y is a hydrogen atom, a monovalent organic group, or a halogen atom, and D is a divalent organic group. D may for example be a linear or branched alkylene group having 1 to 20 carbon atoms, for example a group of the formula $-(CH_2)_x-$ where x is 1 to 10, a group of the formula $-SO_2N(R^1)R^2-$ or of the formula $-CON(R^1)R^2-$, where $R^1$ is an alkyl group having 1 to 10 carbon atoms and $R^2$ is a linear or branched alkylene group having 1 to 10 carbon atoms, or a group of the formula $-CH_2CH(OR^3)CH_2-$ where $R^3$ represents a hydrogen atom or an acyl group having 1 to 10 carbon atoms such as formyl or acetyl, or a group of the formula $-Ar-CH_2-$ where Ar is an arylene group optionally having a substituent. Y may be for example H, Me, Cl, Br, I, F, CN, $CF_3$.

Specific examples of the fluoro-substituted alkyl ester monomer are $CF_3(CF_2)_7(CH_2)_2OCOCH=CH_2$
$CF_3(CF_2)_7(CH_2)_2OCOC(CH_3)=CH_2$
$CF_3(CF_2)_7(CH_2)_{10}OCOCH=CH_2$
$CF_3(CF_2)_7(CH_2)_{10}OCOC(CH_3)=CH_2$
$CF_3(CF_2)_6CH_2OCOCH=CH_2$
$CF_3(CF_2)_8CH_2OCOCH=CH_2$
$(CF_3)_2CF(CF_2)_6(CH_2)_2OCOCH=CH_2$
$(CF_3)_2CF(CF_2)_8(CH_2)_2OCOCH=CH_2$
$(CF_3)_2CF(CF_2)_{10}(CH_2)_2OCOCH=CH_2$
$(CF_3)_2CF(CF_2)_6(CH_2)_2OCOC(CH_3)=CH_2$
$(CF_3)_2CF(CF_2)_8(CH_2)_2OCOC(CH_3)=CH_2$
$(CF_3)_2CF(CF_2)_{10}(CH_2)_2OCOC(CH_3)=CH_2$
$CF_3(CF_2)_9(CH_2)_2OCOCH=CH_2$
$CF_3(CF_2)_9(CH_2)_2OCOC(CH_3)=CH_2$
$CF_3(CF_2)_{11}(CH_2)_2OCOCH=CH_2$
$CF_3(CF_2)_{11}(CH_2)_2OCOC(CH_3)=CH_2$
$CF_3(CF_2)_7SO_2N(CH_3)(CH_2)_2OCOCH=CH_2$
$CF_3(CF_2)_7SO_2N(C_2H_5)(CH_2)_2OCOCH=CH_2$
$(CF_3)_2CF(CF_2)_8CH_2CH(OCOCH_3)CH_2OCOC(CH_3)=CH_2$
$(CF_3)_2CF(CF_2)_6CH_2CH(OH)CH_2OCOCH=CH_2$
$C_8F_{17}-O-Ph-CH_2OCOCH=CH_2$ (where Ph represents 1,4-phenylene)
$C_5F_{11}-O-Ph-CH_2OCOC(CH_3)=CH_2$
$C_8F_{17}-O-Ph-COOCH_2CH(OH)CH_2OCOC(CH_3)=CH_2$
$(CF_3)_2CFOCOC(CH_3)=CH_2$
$(CF_3)_2CF(CH_2)_2OCOC(CH_3)=CH_2$
$CF_3(CF_2)_7SO_2N(CH_3)(CH_2)_2OCOC(F)=CH_2$
$CF_3(CF_2)_7SO_2N(CH_3)(CH_2)_2OCOC(Cl)=CH_2$
$CF_3(CF_2)_7SO_2N(CH_3)(CH_2)_2OCOC(Br)=CH_2$
$CF_3(CF_2)_7SO_2N(CH_3)(CH_2)_2OCOC(I)=CH_2$
$CF_3(CF_2)_7SO_2N(CH_3)(CH_2)_2OCOC(CF_3)=CH_2$
$CF_3(CF_2)_7SO_2N(CH_3)(CH_2)_2OCOC(CN)=CH_2$
$CF_3(CF_2)_7SO_2N(CH_3)(CH_2)_2OCOC(C_6H_5)=CH_2$
$CF_3(CF_2)_7(CH_2)_2OCOC(F)=CH_2$
$CF_3(CF_2)_7(CH_2)_2OCOC(Cl)=CH_2$
$CF_3(CF_2)_7(CH_2)_2OCOC(Br)=CH_2$
$CF_3(CF_2)_7(CH_2)_2OCOC(I)=CH_2$
$CF_3(CF_2)_7(CH_2)_2OCOC(CF_3)=CH_2$
$CF_3(CF_2)_7(CH_2)_2OCOC(CN)=CH_2$
$CF_3(CF_2)_7(CH_2)_2OCOC(C_6H_5)=CH_2$ Esters with a relatively long chain perfluoroalkyl moiety such as heptadecafluorodecyl may be preferred as because they have been widely used in the past to give good oil repellency, or esters with a relatively short chain perfluoroalkyl moiety such as nonafluorohexyl may be preferred as being less persistent in the environment. The fluoro-substituted alkyl ester monomer can if desired be a perfluoroalkyl acrylate or methacrylate such as nonafluorohexyl methacrylate or acrylate.

The aminosiloxane and the fluoro-substituted alkyl ester can optionally be reacted in the presence of one or more olefinically unsaturated co-monomers (iii). Examples of such olefinically unsaturated co-monomers include alkyl acrylate or methacrylate esters having 1 to 30 carbon atoms in the alkyl group such as butyl acrylate, ethyl acrylate, methyl acrylate, methyl methacrylate or butyl methacrylate. The alkyl acrylate or methacrylate can be used to adjust the glass transition temperature (Tg) of the copolymer; for example an acrylate having a long chain alkyl group of 4-20, particularly 8-20 carbon atoms such as stearyl acrylate or methacrylate, octyl acrylate, 2-ethylhexyl acrylate or dodecylacrylate or methacrylate can be used to form a softer polymer of lower Tg. Copolymers with an alkyl acrylate or methacrylate monomer may improve various properties such as water- and oil-repellency and soil releasability, cleaning durability, washing durability and abrasion resistance of such repellency and releasability, solubility in solvent, hardness and feel (handle). Other acrylate or methacrylate co-monomers which can be used are polyethylene glycol acrylate or methacrylate, polypropylene glycol acrylate or methacrylate, methoxypolyethylene glycol acrylate or methacrylate and methoxypolypropylene glycol acrylate or methacrylate, Other olefinically unsaturated co-monomers which can be used are vinyl chloride, vinylidene chloride, styrene, acryonitrile, methacrylonitrile, ethylene, a vinyl alkyl ether, isoprene or a vinyl ester such as vinyl acetate or vinyl propionate. An olefinically unsaturated comonomer can be used which contains a functional group that, although not reactive with amine groups, may be reactive with other functional groups to give properties such as increased substantivity on textiles and other substrates. Examples of such functional groups are hydroxyl, amino and amide, and examples of olefinically unsaturated co-monomers containing them are acrylamide, methacrylamide, N-methylolacrylamide, hydroxyethyl methacrylate, hydroxyethyl acrylate, 3-chloro-2-hydroxypropyl acrylate or methacrylate, N, N-dimethylaminoethyl acrylate or methacrylate and diethylaminoethyl acrylate or methacrylate.

The polymeric reaction product can be prepared by free radical polymerisation of the monomers, preferably in solution, for example in a polar organic solvent such as one or more alcohol, ketone or ester solvents selected from butanol, t-butanol, isopropanol, butoxyethanol, methyl isobutyl ketone, methyl ethyl ketone, butyl acetate or ethyl actetate and/or an aromatic hydrocarbon such as xylene, toluene or trimethylbenzene a blend of one or more of these. The initiator for free radical polymerisation is preferably an azo compound such as azobisisobutyronitrile or azoisovaleronitrile (AIVN) but can be a peroxide such as benzoyl peroxide. The polymerisation temperature can for example be in the range 50-120° C. The free radical polymerisation can if desired be carried out without separation of the aminosiloxane substituted by an ethylenically unsaturated group, for example by adding the fluorocarbon monomer and optionally one or more ethylenically unsaturated co-monomers, and the initiator for free radical polymerisation, to the vessel in which the aminosiloxane substituted by an ethylenically unsaturated group was prepared.

Alternatively the polymeric reaction product can be obtained using the technique of emulsion polymerisation, where all the components are polymerised in the presence of water, surfactants and polymerisation initiator.

The polymeric reaction product can contain various ratios of the aminosiloxane, the fluoro-substituted monomer and the comonomer(s). The copolymer can for example contain 0.1 to 95% by weight of the aminosiloxane (I), 5 to 95% by weight of the fluoro-substituted alkyl ester (II) and 0 to 70% comonomer(s) (III). A polymeric reaction product having a high proportion of aminosiloxane may be preferred for greater substantivity to fibrous substrates or softness of handle of the treated material. A polymeric reaction product having a high proportion of fluoromonomer may be preferred for maximum hydrophobicity and oleophobicity.

The polymeric addition polymerisation product is generally obtained as a solution. It can be isolated by evaporation of the solvent. For application as an oil repellent, the polymeric reaction product is generally required in liquid form and the solution obtained by reaction can often be diluted to a solution suitable for application to textiles. Alternatively the polymeric reaction product can be dissolved in a different solvent for application to textiles, for example in a polar organic solvent of higher boiling point. The polymeric reaction product can alternatively be emulsified by mixing with water and an emulsifying agent, such as a cationic surfactant and/or a nonionic or anionic surfactant. The polymeric reaction product can be isolated before emulsification or the polymerisation product solution can be emulsified, optionally with removal of solvent. If the polymeric reaction product is obtained by emulsion polymerisation, the emulsion is generally used, diluted as required, without isolating the polymeric reaction product.

The solution or emulsion of polymeric reaction product can be applied to fibrous substrates such as textiles by any of the methods known for treatment of textiles with liquids. The concentration of the polymeric reaction product in the solution applied to the textile can for example be 0.5 to 20% by weight, preferably 1 to 5%. When the textile is a fabric, the fabric can be immersed in the solution or can be padded or sprayed with the solution. The treated textile is dried and is preferably heated, for example at 100-200° C., to develop the oil repellency.

The textile which is treated is preferably a fabric, including woven, knitted and nonwoven fabrics, fabrics in garment form and carpet, but can be a fibre or yarn or intermediate textile product such as a sliver or roving. The textile material can be a natural fibre such as cotton or wool, a manmade fibre such as viscose rayon or lyocell or a synthetic fibre such as polyester, polyamide or acrylic fibre, or can be a mixture of fibres such as a mixture of natural and synthetic fibres. The polymeric reaction product of the invention is particularly effective in rendering cellulosic fibres such as cotton or rayon oleophobic and oil repellent. The process of the invention generally also renders the textile hydrophobic and water repellent. Fabric treatment with the polymeric reaction product of the invention imparts oil repellency to fabrics whilst at the same time imparting an improvement in feel compared to untreated fabric and also imparting an improvement in feel compared to fabric treated with known fluoropolymer textile treatment agents.

The fibrous substrate can alternatively be leather. The polymeric reaction product can be applied to leather from aqueous solution or emulsion at various stages of leather processing, for example during leather wet end processing or during leather finishing, to render the leather hydrophobic and oleophobic.

The fibrous substrate can alternatively be paper. The polymeric reaction product can be applied to preformed paper or at various stages of papermaking, for example during drying of the paper.

EXAMPLES

The invention is illustrated by the following Examples, in which percentages are by weight.

Example 1

An aminopropyl end blocked polydimethylsiloxane (degree of polymerisation (dp) 250, 30.4 g), hexanediol diacrylate (1.22 g), xylene (50.3 g) and butan-1-ol (50.6 g) were charged to a reaction vessel and heated to 90° C. for twenty minutes under nitrogen.

After twenty minutes hydroxyethylmethacrylate (16.6 g), dodecanethiol (1.05 g), $CH_2=C(CH_3)COO(CH_2)_2C_8F_{17}$ fluoromonomer FM (26.5 g) and 1,1'-azo-bis-cyclohexanecarbonitrile (0.45 g) were then charged to the reaction vessel and the temperature maintained at 90° C. under nitrogen for a further six hours. After six hours the reaction was cooled to yield a solution of a soft oil and water repellent polymer.

The resulting solution was then diluted with 2-butanone to yield a solution containing 2% w/w polymer. The resulting solution was then applied to a range of fabrics. The solution was applied to the fabric (6 cm×6 cm piece) to give 100% wet pick up. The fabrics were then air dried for 24 hours and then heat cured at 150° C. for three minutes.

The oil and water repellency and hand of the fabrics were evaluated and the results are shown in Tables 1 to 4 below.

Example 2

An amino-functional siloxane (40.5 g) with a viscosity of 1,200 cP and a nitrogen content of 0.38% w/w [II]

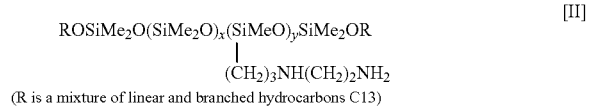

stearyl acrylate (5.2 g), xylene (50.3 g) and butan-1-ol (50.7 g) were charged to a reaction vessel and heated to 90° C. for fifteen minutes under nitrogen. To the reaction vessel was then added hexanediol diacrylate (1.53 g) and the reaction held at 90° C. for a further fifteen minutes under nitrogen.

Fluoromonomer FM (30.3 g), hydroxyethylmethacrylate (16.5 g), dodecanethiol (1.06 g), 2-butanone (30 g) and, 1,1'-azo-bis-cyclohexanecarbonitrile (0.45 g) were then added to the reaction vessel and the reaction temperature maintained at 90° C. for seven hours to yield a solution of a soft water and oil repellent polymer.

The resulting solution was then diluted with 2-butanone to yield a solution containing 2% w/w polymer and was applied to fabrics and tested as described in Example 1.

Example 3

An amino-functional siloxane (40.2 g) with a viscosity of 2,500 cP and a nitrogen content of 0.4% w/w [III]

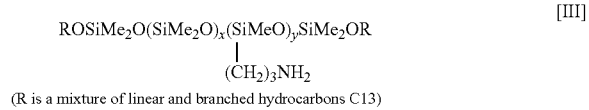

stearyl acrylate (5.18 g), xylene (51.6 g) and butan-1-ol (53.5 g) were charged to a reaction vessel and heated to 90° C. for fifteen minutes under nitrogen. To the reaction vessel was then added hexanediol diacrylate (1.55 g) and the reaction held at 90° C. for a further fifteen minutes under nitrogen.

Fluoromonomer $CH_2=CHCOO(CH_2)_2C_8F_{17}$ FA (30.8 g), hydroxyethylmethacrylate (16.9 g), dodecanethiol (1.06 g), 2-butanone (30 g) and, 1,1'-azo-bis-cyclohexanecarbonitrile (0.45 g) were then added to the reaction vessel and the reaction temperature maintained at 90° C. for seven hours to yield a solution of a soft water and oil repellent polymer.

The resulting solution was then diluted with 2-butanone to yield a solution containing 2% w/w polymer and was applied to fabrics and tested as described in Example 1.

Comparative Example

Fluoromonomer $CH_2=CHCOO(CH_2)_2C_8F_{17}$ FA (30.2), hydroxyethylmethacrylate (16.1), dodecanethiol (1.05), 2-butanone (32.8 g) and, 1,1'-azo-bis-cyclohexanecarbonitrile (0.45 g) were then added to the reaction vessel and the reaction temperature maintained at 90° C. for seven hours to yield a reference oil and water repellent fluorocarbon polymer.

In the tests reported in Tables 1 to 4, this fluorocarbon polymer was used alone and in blends with each of the aminosiloxanes (I), (II) and (III).

Test Methods

The oil repellency of the treated fabrics was evaluated using AATCC test method 118-1997.

The water repellency of the treated fabrics was evaluated using the spray test method, AATCC 22-1996.

Water repellency was also measured by the IPA/water test, in which various solutions water/isopropanol having ratios by volume comprised from 100/0 to 0/100 as reported in the table below.

| Solution H$_2$O/IPA (vol/vol) | Water repellency Index |
|---|---|
| 100/0 | 0 |
| 90/10 | 1 |
| 80/20 | 2 |
| 70/30 | 3 |
| 60/40 | 4 |
| 50/50 | 5 |
| 40/60 | 6 |
| 30/70 | 7 |
| 20/80 | 8 |
| 10/90 | 9 |
| 0/100 | 10 |

Four drops with a diameter of approximately 3 mm of the isopropanol/water solution are deposited on a sample of treated fabric. The behaviour of the four drops is observed for a time of 30 seconds. If three out of the four drops show no absorption or darkening of the fabric then one moves to the next solution with a higher content of isopropanol. The water repellency index/rating relates to the last test solution that did not absorb into or darken the fabric surface.

The handle of the treated cotton fabrics was assessed on a scale of 1 to 10, where 1=harsh, 10=very soft

TABLE 1

Results for oil repellency

| Sample | Cotton | Cotton/Polyester | Polyester | Nylon |
|---|---|---|---|---|
| Example 1 | 4 | 5 | 5 | 5 |
| Example 2 | 5 | 6 | 6 | 6 |
| Example 3 | 6 | 7 | 6 | 6 |
| Control | 6 | 6 | 6 | 6 |
| Control + 0.3% w/w [I] | 2 | 3 | 2 | 2 |
| Control + 0.3% w/w [II] | 1 | 2 | 2 | 1 |
| Control + 0.3% w/w [III] | 1 | 1 | 2 | 1 |

Table 1 shows that the oil repellency of fabrics treated with the fluorosilicone hybrid polymeric reaction products of the invention is better than fabrics treated with the control fluorocarbon polymer blended with the aminosilicones used to prepare the hybrid polymeric reaction products. The oil repellency of fabrics treated with the fluorosilicone hybrid polymeric reaction products of Examples 2 and 3 is as good as fabrics treated with the control fluorocarbon polymer.

TABLE 2

Results for water repellency spray test.

| Sample | Cotton | Cotton/ Polyester | Polyester | Nylon |
|---|---|---|---|---|
| Example 1 | 80 | 80 | 90 | 90 |
| Example 2 | 90 | 90 | 90 | 80 |
| Example 3 | 90 | 80 | 90 | 90 |
| Control | 80 | 80 | 90 | 90 |
| Control + 0.3% w/w [I] | 70 | 70 | 80 | 60 |
| Control + 0.3% w/w [II] | 70 | 80 | 70 | 80 |
| Control + 0.3% w/w [III] | 60 | 60 | 70 | 70 |

TABLE 3

Results for IPA/water test

| Sample | Cotton | Cotton/ Polyester | Polyester | Nylon |
|---|---|---|---|---|
| Example 1 | 8 | 8 | 8 | 8 |
| Example 2 | 9 | 10 | 9 | 10 |
| Example 3 | 10 | 10 | 10 | 9 |
| Control | 9 | 8 | 8 | 8 |
| Control + 0.3% w/w [I] | 7 | 8 | 7 | 7 |
| Control + 0.3% w/w [II] | 8 | 8 | 7 | 8 |
| Control + 0.3% w/w [III] | 6 | 6 | 6 | 7 |

Tables 2 and 3 show that the water repellency of fabrics treated with the fluorosilicone hybrid polymeric reaction products of the invention is better than fabrics treated with the control fluorocarbon polymer blended with the aminosilicones used to prepare the hybrid polymeric reaction products, and as good as fabrics treated with the control fluorocarbon polymer.

TABLE 4

Handle Evaluation

| Sample | Handle |
|---|---|
| Example 1 | 6 |
| Example 2 | 8 |
| Example 3 | 10 |
| Control | 2 |
| Control + 0.3% w/w [I] | 6 |
| Control + 0.3% w/w [II] | 7 |
| Control + 0.3% w/w [III] | 9 |

Table 4 shows that the handle of fabrics treated with the fluorosilicone hybrid polymeric reaction products of the invention is at least as soft as fabrics treated with the control fluorocarbon polymer blended with the aminosilicones used to prepare the hybrid polymeric reaction products, and is very much softer than fabrics treated with the control fluorocarbon polymer alone.

The invention claimed is:

1. A composition comprising the polymeric reaction product of;
    i. an aminosiloxane containing amino groups substituted by a group of the formula (—$CH_2$CHR"—COO—X—OOC—CR"=$CH_2$), where each R" independently represents H or methyl and X represents a divalent organic linkage,
    ii. a fluoro-substituted alkyl ester of an ethylenically unsaturated carboxylic acid, and optionally
    iii. one or more ethylenically unsaturated co-monomers.

2. The composition according to claim 1 wherein X represents an alkylene group having 1 to 20 carbon atoms.

3. The composition according to claim 1, wherein the aminosiloxane is also substituted by an organic moiety which has no ethylenic unsaturation.

4. The composition according to claim 1 wherein some of the amino groups of the aminosiloxane are unsubstituted aminoalkyl groups of the formula R—(NH-A')$_q$-NH-A- attached to silicon, wherein A and A' are each independently a linear or branched alkylene group having 1 to 6 carbon atoms; q=0-4; and R is hydrogen or an alkyl or hydroxyalkyl group having 1 to 4 carbon atoms.

5. The composition according to claim 1 wherein the aminosiloxane is a polyorganosiloxane having terminal or pendant aminoalkyl groups.

6. The composition according to claim 1 wherein the aminosiloxane also contains amino groups modified by reaction with a lactone, epoxide, isocyanate or anhydride.

7. The composition according to claim 1, wherein the fluoro-substituted alkyl ester monomer is a fluoro-substituted alkyl ester of an ethylenically unsaturated carboxylic acid of the formula $CH_2$=C(Y)COO-D-$R_f$ where $R_f$ is a fluoroalkyl group having 1 to 21 carbon atoms, Y is hydrogen, a monovalent organic group, or a halogen atom, and D is a divalent organic group.

8. The composition according to claim 7 wherein D is a linear or branched alkylene group having 1 to 20 carbon atoms and Y is H, Me, Cl, Br, I, F, CN, or $CF_3$.

9. The composition according to claim 1 wherein the reaction product contains 0.1 to 95% by weight of the aminosiloxane, 5 to 95% by weight of the fluoro-substituted alkyl ester and 0 to 70% co-monomer(s).

10. A textile treatment composition comprising the composition according to claim 1.

11. A process for rendering fabric, leather, carpet, non wovens or paper oleophobic characterised in that the composition according to claim 1 is applied to the fabric, leather or paper.

* * * * *